(No Model.)
J. L. PRATT.
ELECTRIC BELT.
No. 443,226. Patented Dec. 23, 1890.
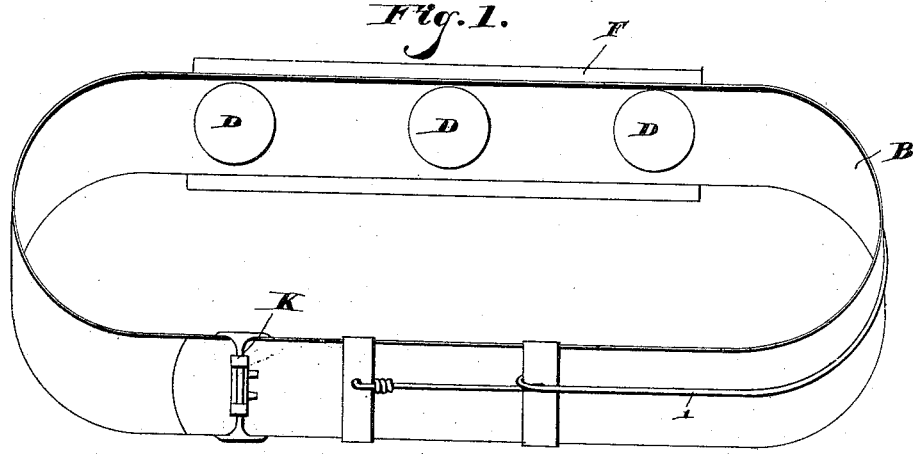
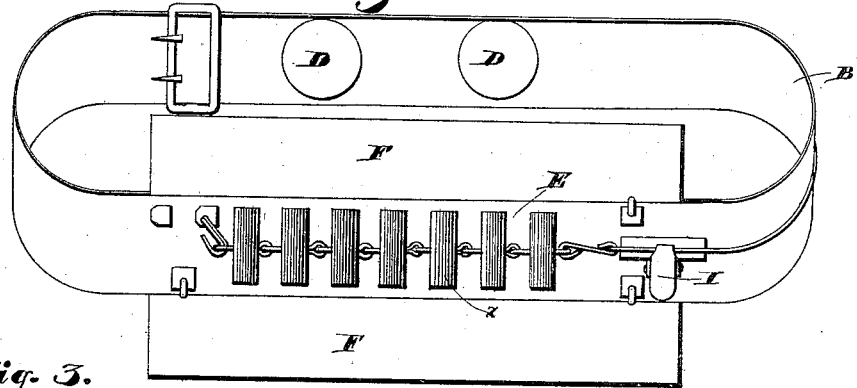
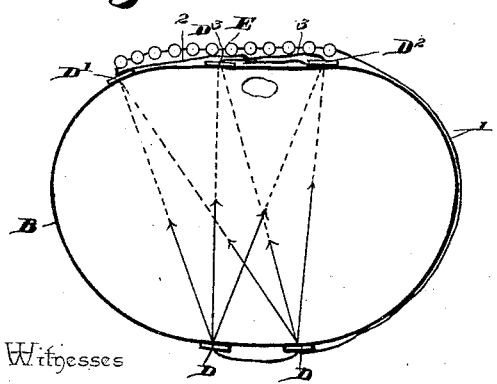
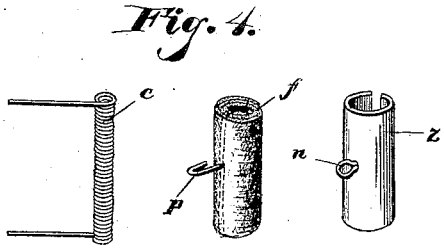
Witnesses
Samuel Ker.
Inventor
John L. Pratt
By his Attorneys,
N. L. Collamer
C. A. Snow & Co.

UNITED STATES PATENT OFFICE.

JOHN L. PRATT, OF DAVID CITY, NEBRASKA.

ELECTRIC BELT.

SPECIFICATION forming part of Letters Patent No. 443,226, dated December 23, 1890.

Application filed May 6, 1890. Serial No. 350,736. (No model.)

*To all whom it may concern:*

Be it known that I, JOHN L. PRATT, a citizen of the United States, residing at David City, in the county of Butler and State of Nebraska, have invented a new and useful Electric Belt, of which the following is a specification.

This invention relates to surgical electricity, and more particularly to the electric belts used therein; and the object of the invention is to improve the construction of belts of this general character heretofore made.

With this end in view the invention consists of the details of construction, hereinafter more fully described and claimed as new, all as illustrated in the drawings, in which—

Figure 1 is a front and Fig. 2 a rear elevation in perspective of the belt, showing the battery-case open. Fig. 3 is a diagrammatic view showing the direction of the currents through the battery in the belt and through the body. Fig. 4 is a detail of the several parts of each cell of the battery.

Referring to the said drawings, the letter B designates the belt proper, which may be of cloth, rubber, or any other desired material which is a non-conductor of electricity, and the ends of this belt are secured or fastened by the clasp K in front of the wearer in the usual manner.

F are flaps formed upon the body of the belt at the rear, which flaps, when folded over onto each other and buttoned, constitute the battery-chamber and contain the electric battery E. The said battery is composed of a number of cells, each of which is of the same construction, to wit: $c$ is a coil of copper wire, and $f$ is a small sheet of fabric wrapped around said coil. The terminals of the coil are then bent toward each other, one of them being continued in the hook $p$, which is the positive pole of the cell. Around this roll of fabric is passed a curved sheet of zinc $z$, the hook $p$ being allowed to protrude between the edges of said zinc sheet, which edges are not quite in contact. To the inside of said zinc sheet opposite said edges is soldered a wire whose center protrudes through a hole at the center of the zinc sheet and is bent into an eye, which forms the negative pole $n$ of the cell. A number of these cells are connected by having their positive hooks $p$ engaged with their negative eyes $n$ and the whole soaked in an exciting-fluid, whereby a strong battery E is formed, as will be understood.

D are silver or silver-plated disks supported by the belt B—three at the back of the wearer and two in front—as shown in Fig. 3. The front disks D are connected by a wire 1 with the negative pole of the right-hand cell, said wire being supported by a clip I, and the positive pole of the left-hand cell is connected with the end disk D' at the back. This disk is in turn connected by wire 2 with the opposite end disk of the back $D^2$, and the latter is connected by wire 3 with the intermediate disks $D^3$, all as shown in the diagram, said wires 2 and 3 being inclosed within the material of the case. The current is thus caused to pass through the body of the wearer in six divided courses, as indicated; or, if the belt be reversed end for end, the courses of the current will of course be reversed. This arrangement has been found to possess especial merit where the patient is weak or needs strength in the back and where a strong current, if passed through one point in the back, would cause injury. The current in this battery can be regulated in strength by attaching more or less of the cells, as will be understood, and said cells must from time to time be energized by an exciting-fluid, such as vinegar and the like.

The specific details and arrangement of parts can be considerably modified without departing from the spirit of my invention.

I do not limit myself to the precise number of disks employed, as more or less can be used without departing from the spirit of my invention. When more are used, the current courses will of course be individually weaker, and conversely. The connections of the wires with the disks are by hooks and eyes, whereby this change in the number of the disks may be made; or other disks may be added to the belt detachably and the wires hooked thereto in a manner which will be clearly understood. The battery can be changed end for end to change the direction of the current without changing the belt end for end, and whether the battery is reduced or enlarged in size the clasp of the belt always holds the latter tight.

I claim as the salient features of this invention—

1. The herein-described cell for electric batteries, the same comprising an inner coil of copper, a surrounding roll of fabric, the ends of the copper coil clamping the fabric in place and being bent into a hook, a covering of sheet-zinc curved around the roll, the edges thereof being open and said hook protruding therethrough and forming one pole of the battery, and a wire secured inside said sheet opposite said edges and an eye thereof passing through a hole in the sheet and forming the other pole, as set forth.

2. An electric belt having a battery-case at the wearer's back, a battery therein composed of a number of cells, one pole of each being a hook and the other an eye, whereby they are detachably and removably connected, metallic disks beneath said case, metallic disks supported by the belt at the front of the wearer, all said disks resting against the wearer's flesh, and insulated wires detachably connecting said disks at the back with one pole of the battery and those at the front with the other pole, the wires at the back being inclosed within the material of the case, substantially as described.

In testimony that I claim the foregoing as my own I have hereto affixed my signature in presence of two witnesses.

JOHN L. PRATT.

Witnesses:
O. S. HASKELL,
BUTLER CHORNING.